United States Patent

Ketteringham

[11] Patent Number: 6,116,897
[45] Date of Patent: Sep. 12, 2000

[54] FASTENER INSTALLING APPARATUS

[75] Inventor: Roger Harry Ketteringham, Halesowen, United Kingdom

[73] Assignee: McKechnie (UK) Limited, West Midlands, United Kingdom

[21] Appl. No.: 09/030,103

[22] Filed: Feb. 25, 1998

[30] Foreign Application Priority Data

Feb. 28, 1997 [GB] United Kingdom .................. 9704229

[51] Int. Cl.⁷ ..................................................... F27B 9/16
[52] U.S. Cl. ........................................... 432/141; 432/138
[58] Field of Search .................................. 432/138–139, 432/141, 142, 143, 123, 124

[56] References Cited

U.S. PATENT DOCUMENTS

| | | | |
|---|---|---|---|
| 3,842,482 | 10/1974 | Stephens | 29/447 |
| 3,883,295 | 5/1975 | Lowderman et al. | 432/138 |
| 3,926,356 | 12/1975 | Still | 227/114 |
| 4,192,079 | 3/1980 | Brookhyser et al. | 34/13.8 |
| 4,488,672 | 12/1984 | Faucher | 227/156 |
| 4,496,312 | 1/1985 | Yamada et al. | 432/138 |
| 4,766,798 | 8/1988 | David et al. | 86/27 |
| 4,872,603 | 10/1989 | Stearns | 227/97 |
| 5,478,057 | 12/1995 | Wilhelmi et al. | 432/142 |
| 5,665,302 | 9/1997 | Benni et al. | 432/152 |
| 5,722,825 | 3/1998 | Edenhofer | 432/138 |

FOREIGN PATENT DOCUMENTS

| | | |
|---|---|---|
| 58-076213 | 5/1983 | Japan . |
| 58-160022 | 9/1983 | Japan . |
| 2 124 532 | 10/1985 | United Kingdom . |

Primary Examiner—Mark Paschall
Assistant Examiner—Gregory A. Wilson
Attorney, Agent, or Firm—Woodcock Washburn Kurtz Mackiewicz & Norris LLP

[57] ABSTRACT

A fastener installing machine (10) comprising an oven (12) for heating fasteners, a carousel (14) for moving fasteners through the oven, a drive shaft (18) for rotating the carousel and means (32,38) for attaching the oven to the machine which means is disposed about the rotational axis of the drive shaft. A fastener installing machine (10) comprising an oven (12) for heating fasteners, a carousel (14) for carrying fasteners through the oven, an inlet to the oven for fasteners from a feeding mechanism, and an outlet from the oven to enable the heated fasteners to be attached to a substrate, wherein the inlet and outlet subtend an angle less than or approximately equal to 90° with respect to the rotational axis of the carousel. Also a fastener installing machine (10) comprising an oven (12), a carousel (14) for rotating fasteners within the oven, and a drive mechanism (16) for rotating the carousel which mechanism comprises a rotatable shaft (18) connectable to a driven gear, and means (30) is provided for indexing the rotation of the gear thereby to enable alignment of a selected portion of the carousel with a fastener outlet from the oven, or a fastener inlet to the oven.

16 Claims, 5 Drawing Sheets

FASTENER INSTALLING APPARATUS

BACKGROUND OF THE INVENTION

The invention relates to apparatus for installing fasteners, such as knurled metallic bushes, into thermoplastics.

It is known to provide fastener installation apparatus comprising a feeding mechanism for the fasteners which leads the fasteners through an oven in order to heat the fasteners to a predetermined temperature, such as 400° C. The feeding mechanism then moves the heated fasteners beyond the oven ready for installation in a substrate such as pre-drilled thermoplastic component for example for a telephone or the like. The known apparatus comprises a push rod for forcing the heated fastener into the pre-drilled hole in the substrate.

Problems exist in known apparatus for example in cooling of the fastener after passing through the oven and before installation, and thermal expansion of components of the feeding mechanism which can lead to misalignment of a fastener with respect to the push-rod and/or receiving aperture, amongst others. The invention seeks to avoid or at least mitigate the problems of the known apparatus.

SUMMARY OF THE INVENTION

According to one aspect of the invention there is provided a fastener installing machine comprising an oven for heating fasteners, a carousel for moving fasteners through the oven, a drive shaft for rotating the carousel and means for attaching the oven to the machine which is disposed about the rotational axis of the drive shaft. Preferably the oven is suspended solely by the attaching means which is substantially symmetrically disposed about the rotational axis of the drive shaft. More preferably, the rotational axis of the drive shaft passes substantially centrally in to the oven.

Beneficially, such an arrangement provides substantially equal thermal expansion of both the drive shaft and the oven attaching means thereby mitigating against misalignment of a feeding mechanism, a push-rod, a heated fastener in the carousel, and or an aperture in a substrate.

In the preferred form, the means for attaching the oven to the machine comprises a bearing for the drive shaft. Preferably, the oven, attaching means and part of the drive shaft are detachable from the machine as a unit.

According to another aspect of the invention there is provided a fastener installing machine comprising an oven for heating fasteners, a carousel for carrying fasteners through the oven, an inlet to the oven for fasteners from a feeding mechanism, and an outlet from the oven to enable the heated fasteners to be attached to a substrate, wherein the inlet and outlet subtend an angle less than or approximately equal to 90° with respect to the rotational axis of the carousel. Beneficially, the carousel rotates through approximately 270° or more between the inlet and outlet thereby ensuring that the fasteners are properly heated. Preferably, the angle subtended is in the order of 60°.

According to another aspect of the invention, a fastener installing machine is provided comprising an oven and a carousel for rotating fasteners within the oven, and a drive mechanism for rotating the carousel which mechanism comprises a rotatable shaft connectable to a driven gear, and means is provided for indexing the rotation of the gear thereby to enable alignment of a selected portion of the carousel with a fastener outlet from the oven, or a fastener inlet to the oven.

Preferably, the indexing mechanism comprises a pawl for engaging and locking the driven gear. Preferably a cam plate is associated with the driven gear and a cam follower associated with the pawl co-operates with the cam plate in order to index the engagement of the pawl in the driven gear. Preferably an actuator is provided for moving the pawl in and out of engagement with the driven gear or cam plate. In a preferred form, the pawl is rocked about a main pivot axis by a single cylinder actuator such as a pneumatic or hydraulically operated cylinder.

Embodiments of the invention will now be described, by way of example only, with reference to the accompanying drawings, in which:

DESCRIPTION OF THE PREFERRED EMBODIMENTS

Figure 1:
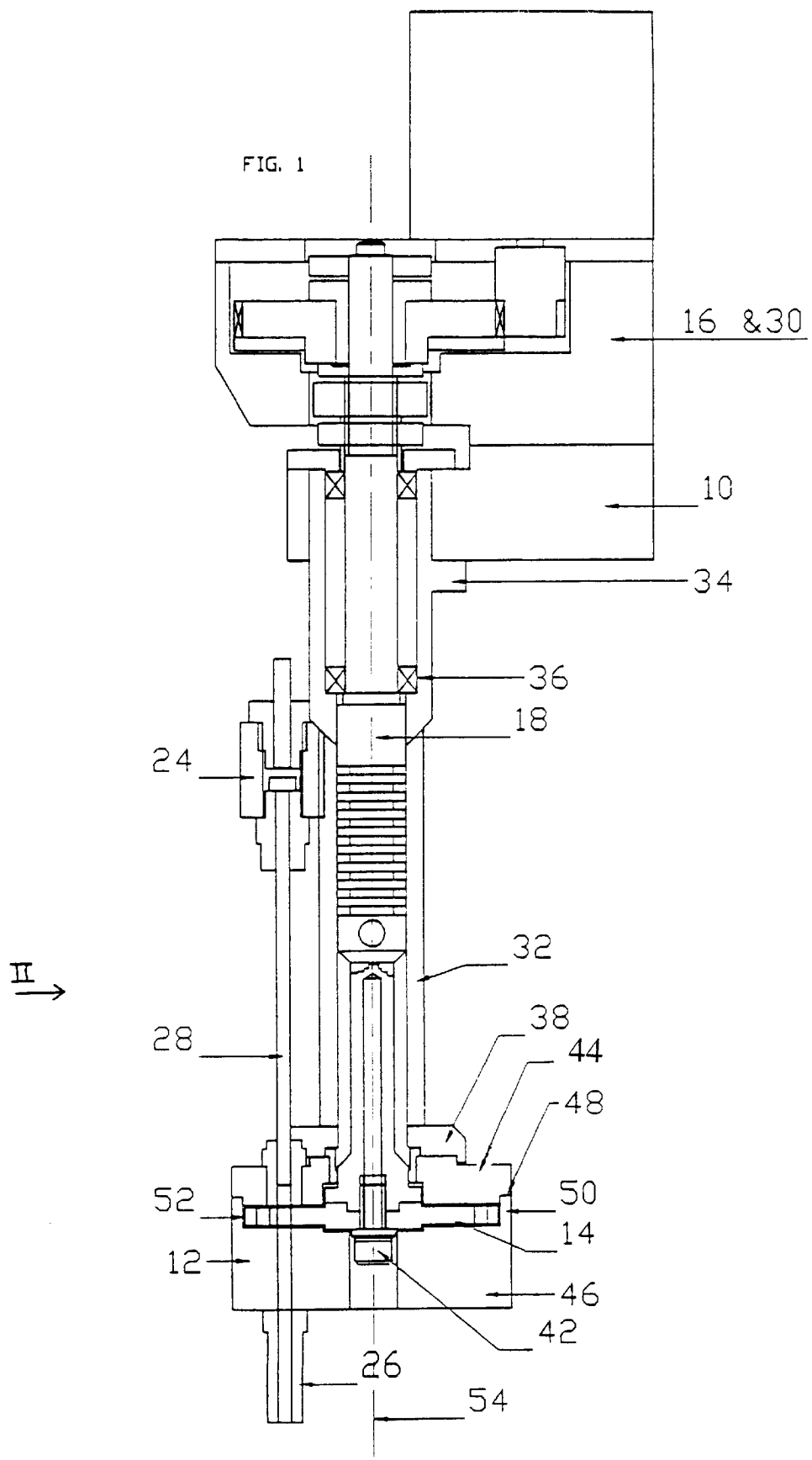
FIG. 1 is a front elevation of part of a machine according to the invention.
Figure 2:
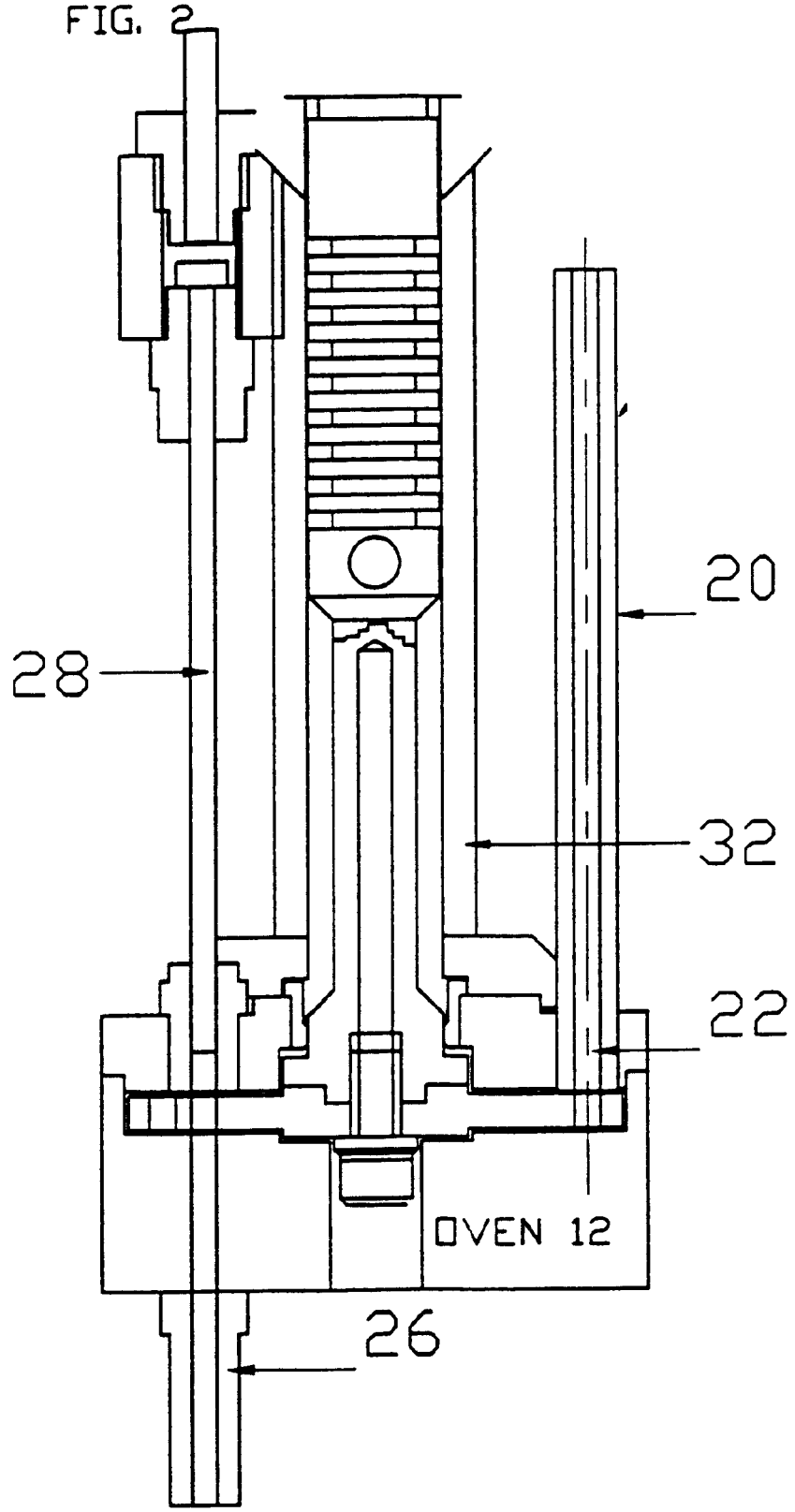
FIG. 2 is a side elevation view along arrow II of some of the components shown in FIG. 1.

Referring to FIGS. 1 and 2, it can be seen that a machine 10 according to the invention comprises an oven 12, such as a radio frequency induction oven or conduction oven comprising heating rods or fire rods for example, housing a carousel 14 for rotating fasteners within the oven. The carousel is driven by a drive mechanism 16 comprising for example a stepper motor, gears and a rotatable shaft 18 connected to carousel 14. The machine 10 further comprises a mechanism 20 for feeding fasteners through an inlet 22 into oven 12. For example, feeding mechanism 20 can substantially be based on a gravity feed mechanism from a hopper (not shown). The machine further comprises a mechanism 24 for pressing fasteners through an outlet 26 from the oven 12. For example, mechanism 24 can comprise a reciprocating push rod 28.

Machine 10 further comprises an indexing mechanism 30 coupled to drive mechanism 16 thereby to control the rotation of carousel 14 within oven 12. As can be seen in FIG. 1, a sleeve 32 is provided for attaching oven 12 to a housing for drive mechanism 16. Sleeve 32 preferably comprises a flange 34 connectable to machine 10 for example using bolts, bearings 36, and a lower flange 38 for attaching to oven 12, again for example by bolts. Drive shaft 18 for coupling to carousel 14 for example using a threaded blind bore and a bolt 42. Oven 12 also preferably comprises an upper main component 44 and lower main component 46. Upper component 44 preferably comprises an annular recess 48 for receiving an annular flange 50 on lower component 46. This arrangement could be the other way round. The components 44 and 46 are connectable for example using nuts and bolts, and the use of annular flange 50 and recess 48 enable the separation of the components accurately to be determined. A recess 52 is provided within the oven for carousel 14.

As can be seen from FIG. 1, preferably sleeve 32, drive shaft 18, oven 12 and carousel 14 are all substantially symmetrically disposed about the rotational axis 54 of drive shaft 18.

Figure 3:
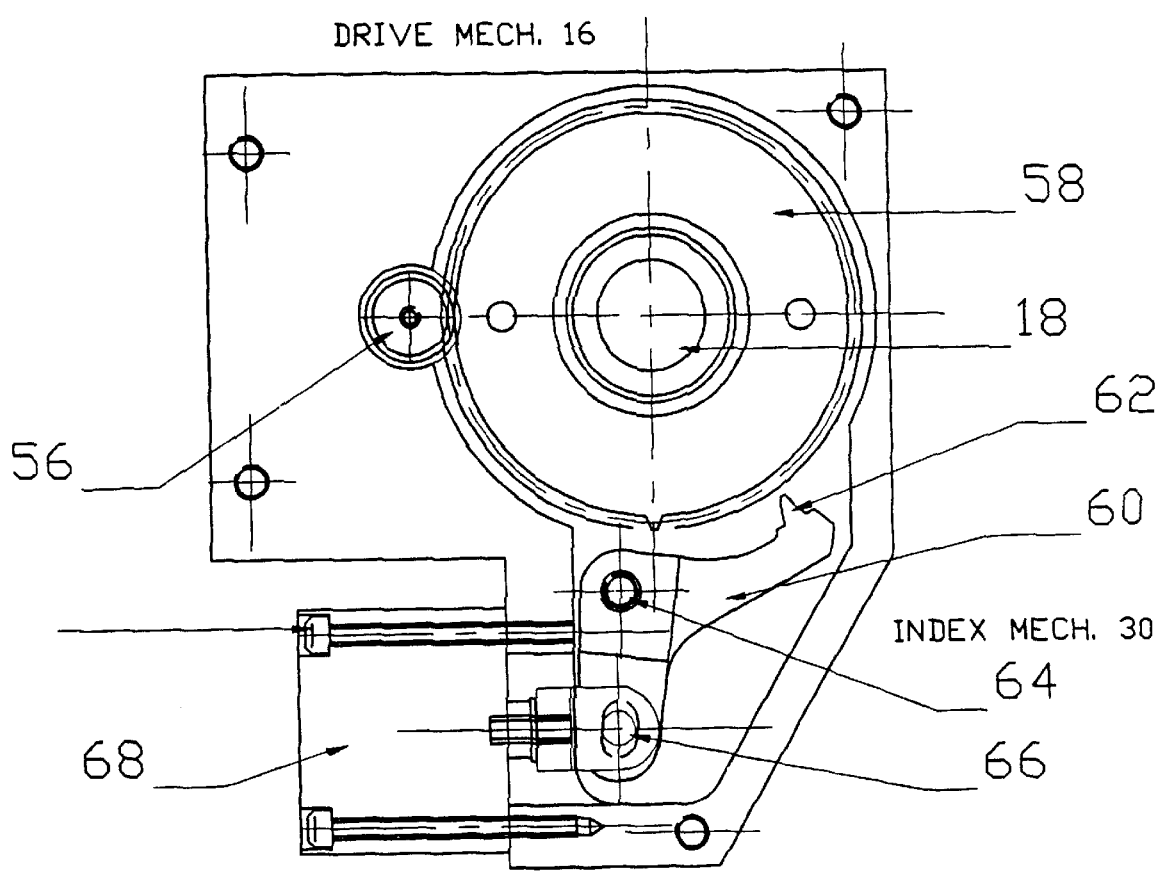
FIG. 3 is a plan view from above of part of the drive mechanism shown in FIG. 1.
Figure 4:
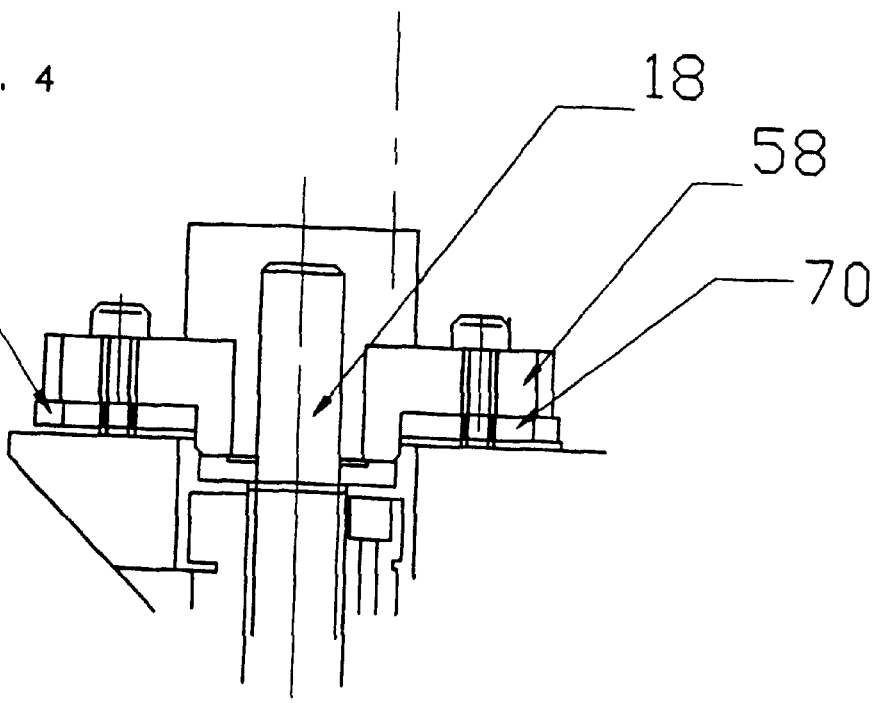
FIG. 4 is a side elevation view of a driven gear shown in FIG. 3.
Figure 5:
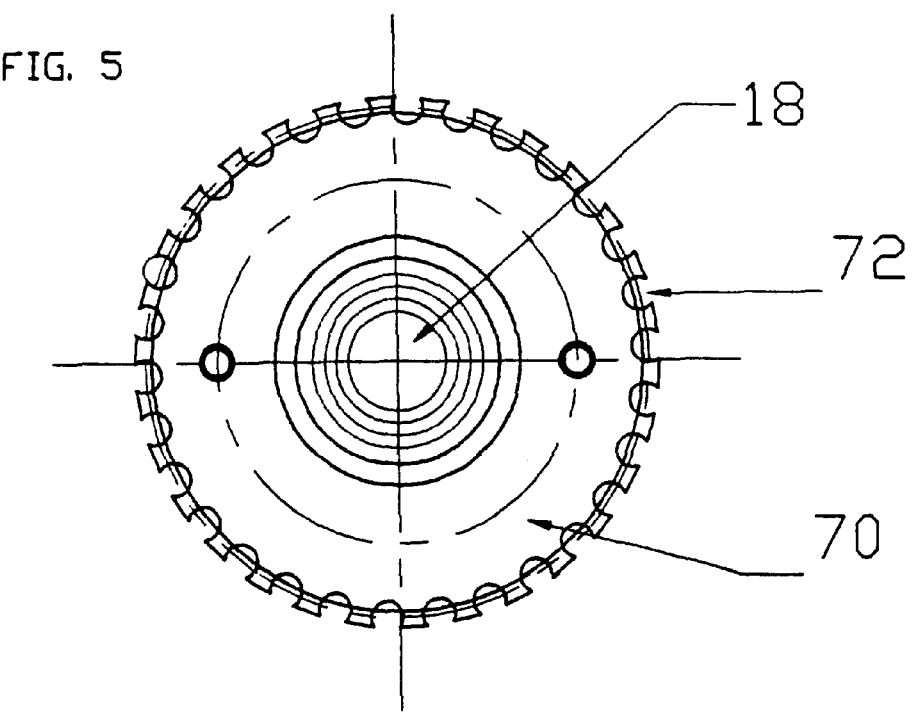
FIG. 5 is a plan view of a cam plate shown in FIG. 4.

Referring to FIGS. 3, 4 and 5, the indexing mechanism 30 is shown in great detail. Drive mechanism 16 can comprise a stepper motor (not shown) coupled via a drive gear 56 to a driven gear 58 coupled to drive shaft 18. The indexing mechanism 30 comprises a pawl 60 for engaging driven gear 58. Pawl 60 comprises a tooth 62 preferably accurately configured to engage and lock in a recess of driven gear 58, a first pivot 64 by which it is attached to the machine and a second pivot 66 connected to an actuator 68 such as a hydraulic or pneumatic cylinder. Referring to FIG. 4, it can be seen that in a preferred form, a cam plate 72 is attached adjacent (above or below) driven gear 58. Cam plate 70 comprises a series of recesses 72 which co-operate with tooth 62 of pawl 60 in order to determine which recess of driven gear 58 the tooth 62 engages. Thus, tooth 62 can act as a cam follower with respect to cam plate 70 or a separate follower attached to pawl 60 can be provided. The position of recesses 72 is predetermined according to the gear ratio between driven gear 58 and drive gear 56 and the position of receiving apertures in carousel 14.

Figure 6:
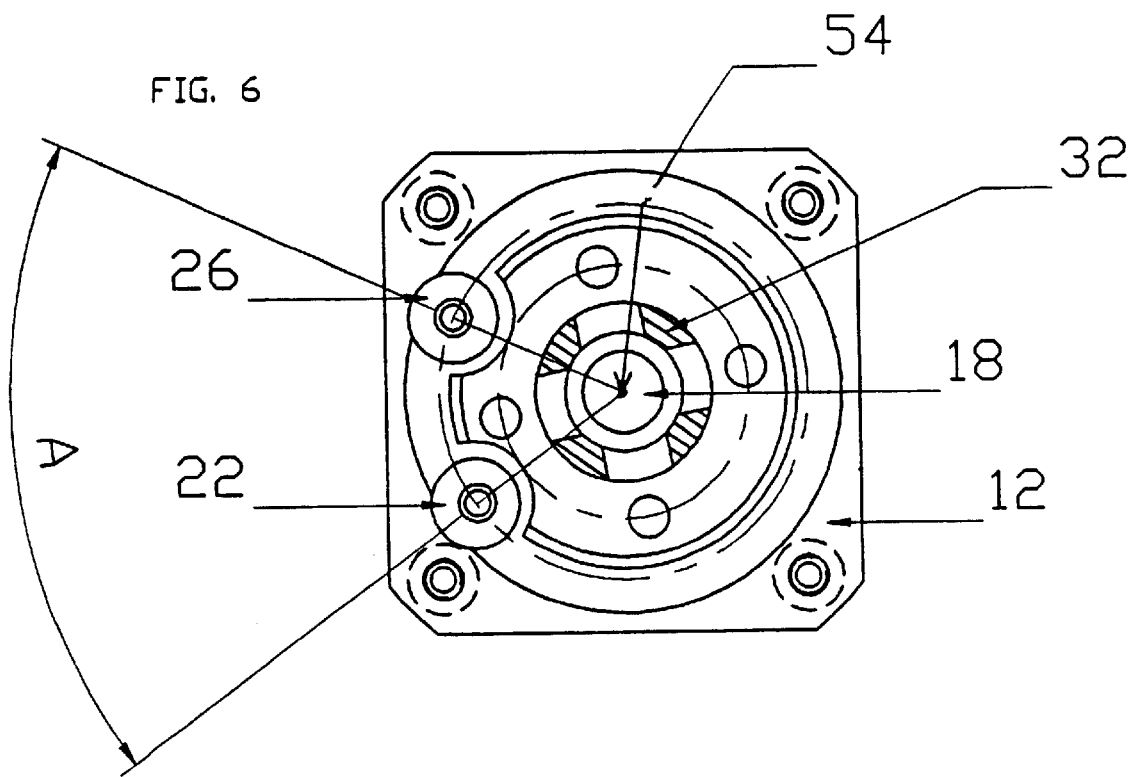
FIG. 6 is a plan view of the oven shown in FIG. 1.
Figure 7:
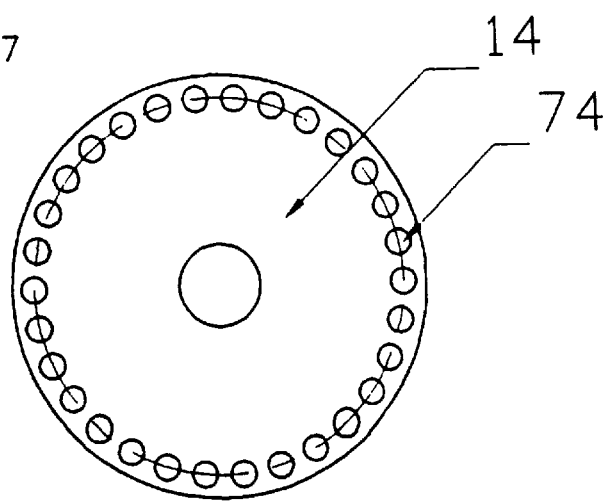
FIG. 7 is a plan view of a carousel held within the oven.

Referring to FIG. 6 and 7, it can be seen that inlet 22 and outlet 26 to and from oven 12 are disposed at an angle A with respect to the rotational axis 54 of shaft 18. In this embodiment, angle A is in the order of 60°

Referring to FIG. 7, an example of a carousel 14 for use in oven 12 is shown. In this example, carousel 14 comprises a series of thirty apertures 74 for carrying fasteners which enter oven 12 through inlet 22 and for transporting the fastener through an angle of some 300°, to outlet 26.

In use, a programmable logic controller, PLC, is programmed to control oven 12, drive mechanism 16, indexing mechanism 30, feed mechanism 20 and output mechanism 24. Fasteners are fed by mechanism 20 through input 22 into oven 12 where they are received in an aperture 74 in carousel 14. An aperture 74 is accurately located below inlet 22 because of the indexing mechanism 30. The carousel is rotated by drive mechanism 16 comprising drive shaft 18 about symmetry axis 54, towards outlet 26. The speed at which carousel 14 moves and the temperature of oven 12 determine the temperature of the fastener by the time it reaches outlet 26. The PLC controls a stepper motor to drive driven gear 58 and to actuate pawl 60 in order individually to step the carousel around axis 54 thereby to present a fastener at a desired temperature at outlet 26. By actuation of mechanism 24 and rod 28, the heated fastener is passed through outlet 26 to be engaged in an aperture in a substrate position below the outlet 26.

Beneficially, because of the symmetrical arrangement of sleeve 32, drive shaft 18, carousel 14 and oven 12, thermal expansion of these components in use, effects substantially uniform expansion of all the components. Thus, the alignment of the carousel 14, inlet 22 and outlet 26 can be set when the apparatus is cold and is not significantly affected at high temperature in use. Additionally, the single attachment sleeve 32 housing drive shaft 18, allows sleeve 32, shaft 18, and oven 12 to be easily removed from machine 10 and replaced by another preset sub-assembly, for example, comprising a carousel 14 adapted for use with a different sized fastener.

What I claim is:

1. A fastener installing machine comprising an oven for heating fasteners, a carousel for moving fasteners through the oven, a drive shaft for rotating the carousel, a means for attaching the oven to the drive shaft which means is disposed about the rotational axis of the drive shaft so as to allow the drive shaft to rotate therein, and a means for outputting a heated fastener from the oven, whereby the outputting means presses the fasteners through an outlet of the oven into a substrate so as to install the fastener therein.

2. A machine according to claim 1 wherein the oven is suspended solely by the attaching means which is substantially symmetrically disposed about the rotational axis of the drive shaft.

3. A machine according to claim 2 wherein the rotational axis of the drive shaft passes substantially centrally in to the oven.

4. A machine according to claim 1 comprising a feeding mechanism for feeding fasteners in or out of the carousel wherein the machine is arranged to provide substantially equal thermal expansion of both the drive shaft and the oven attaching means thereby operably mitigating against misfeeds by the feeding mechanism.

5. A machine according to claim 1 wherein the means for attaching the oven to the drive shaft so as to allow the drive shaft to rotate comprises a bearing for the drive shaft.

6. A machine according to claim 1 wherein the drive shaft comprises a first and second part, wherein the oven, attaching means and the first part of the drive shaft are detachable as a unit from a means for imparting indexed, rotational motion to the drive shaft.

7. A machine according to claim 1 comprising a fastener inlet to the oven and outlet from the oven wherein the means for outputting a heated fastener ejects the fastener from the oven through the outlet and attaches the heated fasteners to a substrate, wherein the inlet and outlet subtend an angle less than or approximately equal to 90° with respect to the rotational axis of the carousel.

8. A fastener installing machine comprising an oven for heating fasteners, a carousel for carrying fasteners through the oven, an inlet to the oven for fasteners from a feeding mechanism, means for outputting a heated fastener from the oven, and an outlet from the oven, wherein the means for outputting a heated fastener ejects the fastener from the oven through the outlet for attachment to a substrate, and wherein the inlet and outlet subtend an angle less than or approximately equal to 90° with respect to the rotational axis of the carousel.

9. A machine according to claim 8 wherein operably the carousel is rotatable through approximately 270° or more to effect movement of a fastener between the inlet and the outlet.

10. A machine according to claim 8 wherein the angle subtended is in the order of 60°.

11. A machine according to claim 8 wherein a drive mechanism for rotating the carousel comprises a rotatable shaft connectable to a driven gear, and means is provided for indexing the rotation of the gear thereby to enable alignment of a selected portion of the carousel with a fastener outlet from the oven, or a fastener inlet to the oven.

12. A fastener installing machine comprising an oven having a fastener inlet and a fastener outlet, means for outputting a heated fastener from the oven, through the outlet for attachment to a substrate, a carousel for rotating fasteners within the oven, and a drive mechanism for rotating fasteners within the oven which mechanism comprises a rotatable shaft connectable to a driven gear, and means is provided for indexing the rotation of the gear thereby to enable alignment of a selected portion of the carousel with the fastener outlet from the oven, or the fastener inlet to the oven.

13. A machine according to claim 12 wherein the indexing mechanism comprises a pawl for engaging and locking the driven gear.

14. A machine according to claim 13 wherein a cam plate is associated with the driven gear and a cam follower associated with the pawl co-operates with the cam plate in order to index the engagement of the pawl in the driven gear.

15. A machine according to claim 14 wherein an actuator is provided for moving the pawl in and out of engagement with the driven gear or cam plate.

16. A machine according to claim 15 wherein the pawl is rocked about a main pivot axis by a single cylinder actuator such as a pneumatic or hydraulically operated cylinder.

* * * * *